(12) United States Patent
Chang et al.

(10) Patent No.: US 12,155,256 B2
(45) Date of Patent: Nov. 26, 2024

(54) FAST CHARGING DRIVER (71) Applicant: National Yang Ming Chiao Tung University, Hsinchu (TW)

(72) Inventors: Edward Yi Chang, Hsinchu County (TW); Stone Cheng, Hsinchu (TW); Wei-Hua Chieng, Hsinchu (TW); Shyr-Long Jeng, Tainan (TW); Chih-Chiang Wu, Keelung (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 448 days.

(21) Appl. No.: 17/660,835

(22) Filed: Apr. 27, 2022

(65) Prior Publication Data

US 2022/0385093 A1 Dec. 1, 2022

(30) Foreign Application Priority Data

May 31, 2021 (TW) .................................. 110119740

(51) Int. Cl.
*H02J 7/04* (2006.01)
*H02J 7/00* (2006.01)

(52) U.S. Cl.
CPC ..... *H02J 7/007182* (2020.01); *H02J 7/00711* (2020.01); *H02J 2207/30* (2020.01)

(58) Field of Classification Search
None
See application file for complete search history.

(56) References Cited

U.S. PATENT DOCUMENTS 8,637,909 B1    1/2014  Vorhaus
10,044,350 B1 *  8/2018  Ribarich .............. H03K 17/691
(Continued)

FOREIGN PATENT DOCUMENTS

CN    207968039 U    10/2018
CN    110336351 A    10/2019
(Continued)

OTHER PUBLICATIONS

Zhe-Ming Guo et al., "A Current-Mode Control Li-Ion Battery Charger With Trickle-Current Mode and Built-In Aging Detection", 2019 IEEE International Symposium on Circuits and Systems (ISCAS), 2019.

(Continued)

*Primary Examiner* — Arun C Williams
(74) *Attorney, Agent, or Firm* — CKC & Partners Co., LLC (57) ABSTRACT

The present disclosure provides a fast charging driver. The fast charging driver is configured to charge a battery of an electronic device. The fast charging driver includes a fast charging circuit and a charging controller. The fast charging circuit includes a first depletion-type GaN transistor, a first enhancement-type field effect transistor, a second depletion-type GaN transistor and a second enhancement-type field effect transistor. The charging controller is configured to control the fast charging circuit to operate in a constant current mode or a constant voltage mode according to a battery level of the battery. By utilizing the first depletion-type GaN transistor and the second depletion-type GaN transistor with a characteristic of a relatively low switching loss, the power consumption during charging the battery by the fast charging driver is decreased to improve the charge speed.

20 Claims, 5 Drawing Sheets

(56) References Cited

U.S. PATENT DOCUMENTS

| | | | |
|---|---|---|---|
| 10,177,588 | B2 | 1/2019 | Huang et al. |
| 10,191,874 | B2 | 1/2019 | Rotchford et al. |
| 10,230,303 | B2 | 3/2019 | Malinin et al. |
| 10,250,151 | B1 | 4/2019 | Wu |
| 10,333,326 | B2 | 6/2019 | Xiao |
| 11,469,675 | B1* | 10/2022 | Safa ............... H02M 3/1584 |
| 2008/0061757 | A1* | 3/2008 | Khayat ............ H02M 3/1588 323/283 |
| 2010/0271850 | A1* | 10/2010 | Huang ............ H01L 29/7803 257/402 |
| 2018/0123585 | A1* | 5/2018 | Bunin ............... H03K 7/08 |
| 2018/0301906 | A1* | 10/2018 | Qureshi ............. H02J 3/32 |
| 2019/0115765 | A1 | 4/2019 | Lai et al. |
| 2019/0294226 | A1 | 9/2019 | Mattos et al. |
| 2020/0144829 | A1 | 5/2020 | Lee et al. |
| 2020/0244079 | A1 | 7/2020 | Meacham, II et al. |
| 2021/0111533 | A1* | 4/2021 | Mousavian ......... G01S 17/10 |

FOREIGN PATENT DOCUMENTS

| | | |
|---|---|---|
| EP | 3159999 A1 | 4/2017 |
| TW | 200835126 A | 8/2008 |
| TW | 201431244 A | 8/2014 |
| TW | 201706746 A | 2/2017 |
| TW | 201710831 A | 3/2017 |
| TW | 201739140 A | 11/2017 |
| TW | 201826079 A | 7/2018 |
| TW | 201901466 A | 1/2019 |
| TW | 201915726 A | 4/2019 |
| TW | 201933717 A | 8/2019 |
| TW | 201939299 A | 10/2019 |

OTHER PUBLICATIONS

Chua-Chin Wang et al., "A 1.5A 88.6% Li-ion Battery Charger Design Using Pulse Swallow Technique in Light Load", 2019 IEEE International Symposium on Circuits and Systems (ISCAS), 2019.

Jian-Fu Wu et al., "A Monolithic High-Voltage Li-Ion Battery Charger With Sharp Mode Transition and Partial Current Control Technique", IEEE Transactions On Circuits and Systems-I: Regular Papers, vol. 65, No. 9, Sep. 2018.

Sheng-Ying Lin et al., "An Area-Efficient Amplifier-Less Digitally-Controlled Li-Ion Battery Charger in 0.35-μm CMOS", 2017 IEEE Asian Solid-State Circuits Conference (A-SSCC), 2017.

Kyoohyun Noh et al., "A Unified Amplifier-Based CC-CV Linear Charger for Energy-Constrained Low-Power Applications", IEEE Transactions On Circuits and Systems-II: Express Briefs, vol. 66, No. 3, Mar. 2019.

Chia-Hsiang Lin et al., "A Li-Ion Battery Charger With Smooth Control Circuit and Built-In Resistance Compensator for Achieving Stable and Fast Charging", IEEE Transactions On Circuits and Systems-I: Regular Papers, vol. 57, No. 2, Feb. 2010.

Youssef Ziadi et al., "A High Efficiency Li-Ion Battery LDO-Based Charger for Portable Application", Active and Passive Electronic Components, vol. 2015, 2015.

Balakumar Muniandi et al., "A 97% Maximum Efficiency Fully Automated Control Turbo Boost Topology for Battery Chargers", IEEE Transactions On Circuits and Systems-I: Regular Papers, vol. 66, No. 11, Nov. 2019.

Wei-Hsu Chang et al., "ZVS Flyback-Converter ICs Optimizing USB Power Delivery for Fast-Charging Mobile Devices to Achieve 93.5% Efficiency", 2020 IEEE International Solid-State Circuits Conference (ISSCC), 2020.

Lan-Rong Dung et al., "A Robust, Intelligent CC-CV Fast Charger for Aging Lithium Batteries", 2016 IEEE 25th International Symposium on Industrial Electronics (ISIE), 2016.

* cited by examiner

FAST CHARGING DRIVER

RELATED APPLICATIONS

This application claims priority to Taiwan Application Ser. No. 110119740, filed May 31, 2021, which is herein incorporated by reference.

BACKGROUND

Field of Invention

The present disclosure relates to a fast charging driver. More particularly, the present disclosure relates to a fast charging driver suitable for being operated in a switching mode.

Description of Related Art

Nowadays, with the phenomenon that people are more and more commonly using mobile devices (such as laptops, mobile phones, tablet computers), how to increase the charge speed of the charger for the battery of the mobile device and improve the energy consumption during the charging process to reduce the charging time of the battery has become an important subject.

For the foregoing reasons, there is a need to solve the above-mentioned problems by providing a fast charging driver.

SUMMARY

A fast charging driver is provided. The fast charging driver comprises a fast charging circuit. The fast charging circuit comprises a first depletion-type GaN transistor, a first enhancement-type field effect transistor, a second depletion-type GaN transistor, and a second enhancement-type field effect transistor. A first terminal of the first depletion-type GaN transistor is electrically coupled to an input terminal of the fast charging driver. A second terminal of the first depletion-type GaN transistor is electrically coupled to a first terminal of an inductor. A second terminal of the inductor is electrically coupled to an output terminal of the fast charging driver. The output terminal of the fast charging driver is configured to be electrically coupled to an anode of a battery. A first terminal of the first enhancement-type field effect transistor is electrically coupled to the second terminal and a gate terminal of the first depletion-type GaN transistor. A second terminal of the first enhancement-type field effect transistor is electrically coupled to a system low voltage terminal. A gate terminal of the first enhancement-type field effect transistor is configured to receive a PWM signal. A first terminal of the second depletion-type GaN transistor is electrically coupled to the input terminal of the fast charging driver. A first terminal of the second enhancement-type field effect transistor is electrically coupled to a second terminal of the second depletion-type GaN transistor. A second terminal of the second enhancement-type field effect transistor is electrically coupled to a gate terminal of the second depletion-type GaN transistor and the output terminal of the fast charging driver. A gate terminal of the second enhancement-type field effect transistor is configured to receive a control signal.

In summary, according to the present disclosure, by disposing the first depletion-type GaN transistor and the second depletion-type GaN transistor with the relatively lower switching loss as the power elements in the fast charging driver, the energy consumption of the fast charging driver in the switching mode is reduced.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DESCRIPTION OF THE EMBODIMENTS

Reference will now be made in detail to the present embodiments of the disclosure, examples of which are illustrated in the accompanying drawings. However, the embodiments provided herein are intended as illustrative only since numerous modifications and variations therein will be apparent to those skilled in the art. Description of the operation does not intend to limit the operation sequence. Any structures resulting from recombination of elements with equivalent effects are within the scope of the present disclosure. In addition, drawings are only for the purpose of illustration and not plotted according to the original size. Wherever possible, the same reference numbers are used in the drawings and the description to refer to the same or like parts for better understanding.

Terms used throughout the specification and the claims typically have common meanings for each of the terms used in this field, in the present disclosure and in special contents, unless specially noted.

Furthermore, it should be understood that the terms, "comprising", "including", "having", "containing", "involving" and the like, used herein are open-ended, that is, including but not limited to. It will be understood that, as used herein, the phrase "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Figure 1:
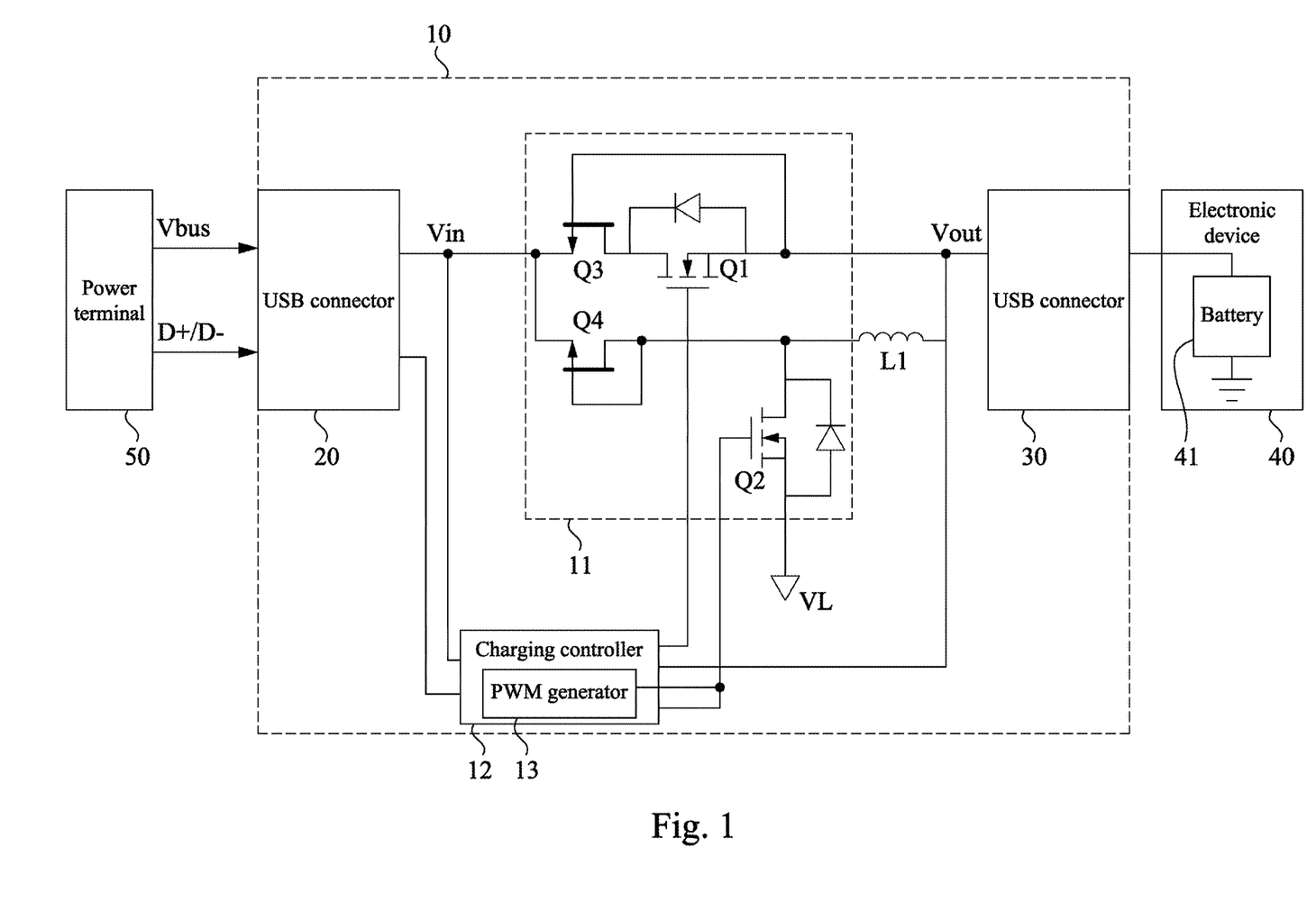
FIG. 1 depicts a circuit structure diagram of a fast charging driver according to some embodiment of the present disclosure.

FIG. 1 depicts a circuit structure diagram of a fast charging driver 10 according to some embodiment of the present disclosure. As shown in FIG. 1, the fast charging driver 10 comprises a fast charging circuit 11, an inductor L1, and a charging controller 12. The charging controller 12 is configured to control the fast charging circuit 11 according to a battery level of a battery 41. The charging controller 12 comprises a pulse-width modulation generator (PWM generator) 13. The fast charging circuit 11 comprises a first depletion-type gallium nitride (GaN) transistor Q4, a first enhancement-type field effect transistor Q2, a second depletion-type GaN transistor Q3, and a second enhancement-type field effect transistor Q1.

As for the structure, the fast charging circuit 11 is electrically coupled between an input terminal Vin and an output terminal Vout of the fast charging driver 10. The input terminal Vin of the fast charging driver 10 is electrically coupled to a voltage pin "Vbus" of a universal serial bus (USB) connector 20. The USB connector 20 may be implemented by a USB type-C regulated by USB Power Delivery. The input terminal Vin of the fast charging driver 10 is electrically coupled to a power terminal 50 through the USB connector 20, and is configured to receive a power voltage of the power terminal 50. The output terminal Vout of the fast charging driver 10 is electrically coupled to a USB connector 30. The USB connector 30 may be implemented by using a USB type-A, a USB type-B, or a USB type-C. In addition, the output terminal Vout of the fast charging driver 10 is configured to be electrically coupled to an anode of the battery 41 through the USB connector 30. The charging controller 12 is electrically coupled to the voltage pin "Vbus" and a data pin "D+/D−" of the USB connector 20 and the output terminal Vout of the fast charging driver 10. The fast charging driver 10 may be used to charge a mobile phone, a power bank, a tablet computer, a wearable electronic device, a charging device of a small electric appliance, a laptop computer, and some other electronic device(s), so the battery 41 can be implemented by using a lithium battery. However, the present disclosure is not limited in this regard.

In some embodiment, charging through some USB ports (for example, USB2.0) will be more difficult to achieve fast charging requirements. This is because the USB ports have strict output current limits, for example, the USB2.0 regulates that the voltage must be 5 volts and the maximum current is only 1.5 amperes. However, the USB type-C regulated by the USB Power Delivery can transmit a variety of combinations of currents and voltages. Therefore, in the present disclosure, the USB type-C regulated by the USB Power Delivery is utilized to implement the USB connectors 20 and 30 so as to charge at a relatively high current or voltage, thus increasing a charge rate.

Additionally, the fast charging driver 10, the power terminal 50, and an electronic device 40 must comply with USB power delivery protocol, so that the electronic device 40 can communicate with the power terminal 50 depending on its needs (for example, a charging voltage and a magnitude of a current). For example, the power terminal 50 can provide a voltage of 5 volts (current is 5.7 amperes), 9 volts (current is 2.85 amperes), and 12 volts (current is 1.25 amperes) through the fast charging driver 10, and the electronic device 40 applies to the power terminal 50 and the fast charging driver 10 for the voltage of 5 volts (current is 5.7 amperes) as the charging voltage. At this time, the fast charging driver 10 can convert the power voltage of the power terminal 50 into the voltage of 5 volts, and transmit the voltage of 5 volts converted from the power voltage of the power terminal 50 to the battery 41 of the electronic device 40.

In some embodiments, the charging controller 12 and charging power elements (such as the first depletion-type GaN transistor Q4, the first enhancement-type field effect transistor Q2, the second depletion-type GaN transistor Q3, and the second enhancement-type field effect transistor Q1) are often integrated on the same circuit substrate. However, since the charging power elements frequently operate at a higher temperature, the charging controller 12 needs to reduce the charge speed to avoid damage to the elements in the charging controller 12 due to the excessively high temperature.

Therefore, the fast charging circuit 11 composed of the charging power elements (the first depletion-type GaN transistor Q4, the first enhancement-type field effect transistor Q2, the second depletion-type GaN transistor Q3, and the second enhancement-type field effect transistor Q1) is disposed on a single-chip circuit substrate, and then the single-chip circuit substrate where the fast charging circuit 11 is disposed is coupled to the charging controller 12 on another circuit substrate. In other words, the fast charging circuit 11 and the charging controller 12 are respectively disposed on different circuit substrates. Hence, when the fast charging circuit 11 operates and generates heat, the heat energy dissipated by the fast charging circuit 11 on a first substrate will not directly affect the charging controller 12 on a second substrate. As a result, the charging controller 12 is not limited by the temperature of the power elements in the fast charging circuit 11 during operation, thus increasing the charge speed and reducing the power consumption.

In other embodiments, the fast charging circuit 11 and the charging controller 12 may be disposed on a same substrate, and the effect of reducing energy consumption can be achieved by the configuration in which the first depletion-type GaN transistor Q4 and the second depletion-type GaN transistor Q3 are used as the power elements. Therefore, the present disclosure is not limited in this regard.

In greater detail, a first terminal of the first depletion-type GaN transistor Q4 is electrically coupled to the input terminal Vin of the fast charging driver 10. A second terminal of the first depletion-type GaN transistor Q4 is electrically coupled to a first terminal of the first enhancement-type field effect transistor Q2. A gate terminal of the first depletion-type GaN transistor Q4 is electrically coupled to the second terminal of the first depletion-type GaN transistor Q4 and a first terminal of the inductor L1. A second terminal of the inductor L1 is electrically coupled to the output terminal Vout of the fast charging driver 10. The first terminal of the first enhancement-type field effect transistor Q2 is electrically coupled to the second terminal of the first depletion-type GaN transistor Q4. A second terminal of the first enhancement-type field effect transistor Q2 is electrically coupled to a system low voltage terminal VL. A gate terminal of the first enhancement-type field effect transistor Q2 is electrically coupled to the PWM generator 13 and is configured to receive a PWM signal (pulse-width modulation signal) and a control signal of the charging controller 12.

A first terminal of the second depletion-type GaN transistor Q3 is electrically coupled to the input terminal Vin of the fast charging driver 10 and a first terminal of the first depletion-type GaN transistor Q4. A second terminal of the second depletion-type GaN transistor Q3 is electrically coupled to a first terminal of the second enhancement-type field effect transistor Q1. A gate terminal of the second depletion-type GaN transistor Q3 is electrically coupled to a second terminal of the second enhancement-type field effect transistor Q1. The first terminal of the second enhancement-type field effect transistor Q1 is electrically coupled to the second terminal of the second depletion-type GaN transistor Q3. The second terminal of the second enhancement-type field effect transistor Q1 is electrically coupled to the output terminal Vout of the fast charging driver 10.

In the present disclosure, two charging modes are provided to increase the charge speed of the fast charging controller. The first mode is a constant current mode. When the battery level of the battery 41 is lower (for example, the battery level of the battery 41 is below 60%), charging in the constant current mode can quickly increase the battery level of the battery 41. The second mode is a constant voltage mode. When the battery level of the battery 41 is higher (for example, the battery level of the battery 41 is above 60%), in order to avoid overcharging, constant voltage charging is adopted to protect the battery 41.

In some embodiments, the fast charging driver 10 can obtain battery level information of the battery 41 from the electronic device 40 by using a protocol chip regulated by the USB Power Delivery. In some other embodiments, the fast charging driver 10 can measure a voltage of the output terminal Vout and determine the battery level of the battery 41 accordingly, so as to obtain the battery level information of the battery 41.

Figure 2A:
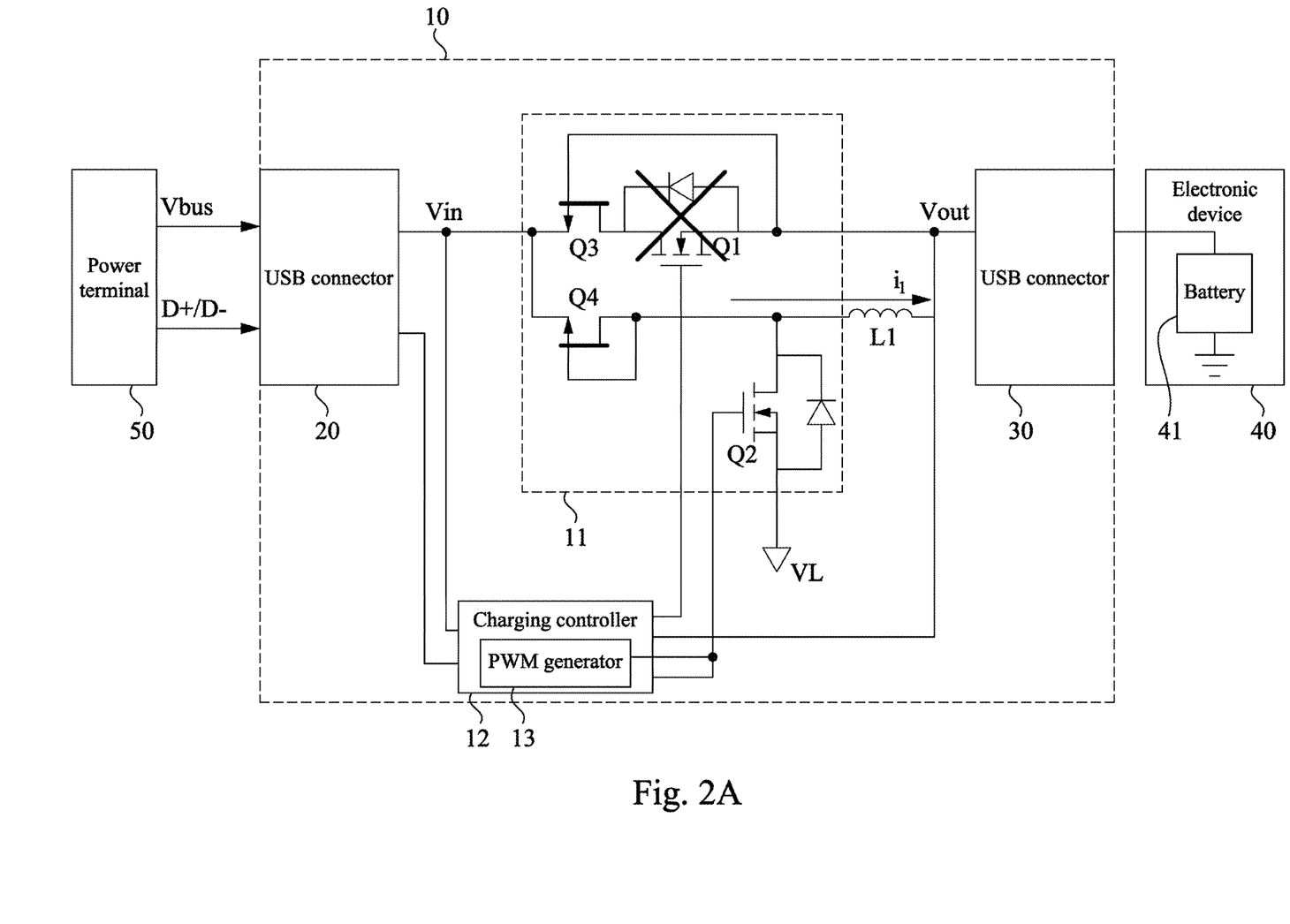
FIG. 2A depicts a circuit diagram of the fast charging driver in FIG. 1 in a constant current mode.
Figure 2B:
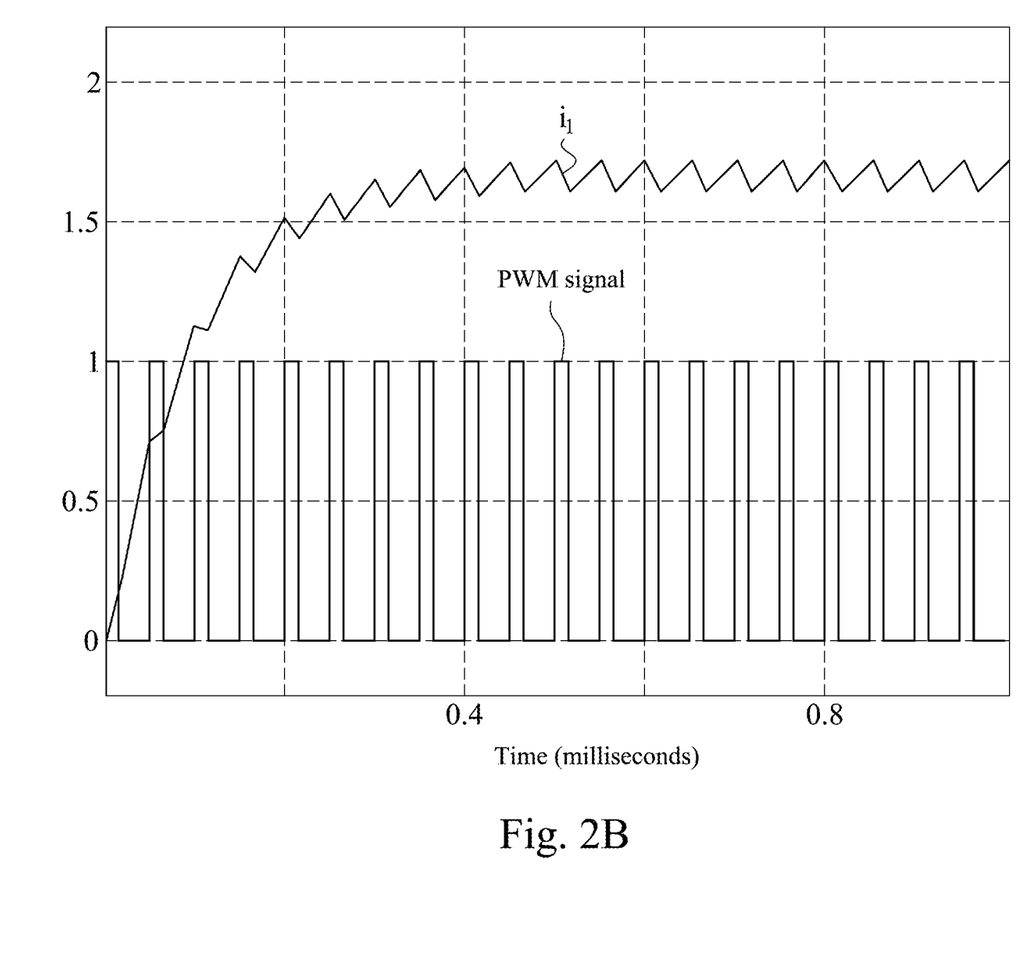
FIG. 2B depicts a waveform diagram of a current of the fast charging driver in FIG. 1 in a constant current mode according to a PWM signal according to some embodiments of the present disclosure.

For a better understanding, a description is provided with reference to FIG. 2A and FIG. 2B for an operation of the fast charging driver 10 in the constant current mode. FIG. 2A depicts a circuit diagram of the fast charging driver 10 in FIG. 1 in a constant current mode. FIG. 2B depicts a waveform diagram of a current of the fast charging driver 10 in FIG. 1 in a constant current mode according to a PWM signal according to some embodiments of the present disclosure. The unit of the current on the vertical axis is amperes, and the unit of the PWM signal on the vertical axis is volts.

It is noted that the first depletion-type GaN transistor Q4 and the second depletion-type GaN transistor Q3 are normally-on GaN transistors. That is, the normally-on GaN transistor is turned on when a voltage at its gate terminal is zero, and is turned off when the voltage at its gate terminal has a negative value (for example, −2~−5 volts).

In the constant current mode, the charging controller 12 turns off the second enhancement-type field effect transistor Q1, so that the second terminal of the second depletion-type GaN transistor Q3 and the output terminal Vout of the fast charging driver 10 are open-circuited. That is to say, the power voltage from the power terminal 50 can not be transmitted to the output terminal Vout of the fast charging driver 10 through the second enhancement-type field effect transistor Q1. In addition to that, the charging controller 12 controls the PWM generator 13 to generate the PWM signal to the gate terminal of the first enhancement-type field effect transistor Q2. When the PWM signal is at a low level, the first enhancement-type field effect transistor Q2 is turned off, so that the second terminal and the gate terminal of the first depletion-type GaN transistor Q4 are disconnected from the system low voltage terminal VL. In this manner, the power voltage from the power terminal 50 is transmitted to the inductor L1. When the PWM signal is at a high level, the first enhancement-type field effect transistor Q2 is turned on, so that the second terminal and the gate terminal of the first depletion-type GaN transistor Q4 are electrically connected to the system low voltage terminal VL. In this manner, voltage levels of the second terminal and the gate terminal of the first depletion-type GaN transistor Q4 are pulled down, so that a current path from the input terminal Vin to the output terminal Vout through the first depletion-type GaN transistor Q4 is turned off. At this time, the second depletion-type GaN transistor Q3, the second enhancement-type field effect transistor Q1, and the inductor L1 function and operate as a buck converter, so that the voltage of the output terminal Vout is lower when compared with a voltage of the input terminal Vin and the current that is output is higher than a current that is input.

As a result, by providing the PWM signal to the gate terminal of the first enhancement-type field effect transistor Q2, a potential of the first terminal of the inductor L1 responds to switching of the first enhancement-type field effect transistor Q2 and is pulled high when the PWM signal is at the low level and is pulled low when the PWM signal is at the high level. In this manner, a potential change of the first terminal of the inductor L1 is converted into the current through the inductor L1, and the current is transmitted to the output terminal Vout of the fast charging driver 10, and the current is transmitted to the anode of the battery 41 through the USB connector 30 to charge the battery 41 with a constant current.

In some embodiments, specific packaging methods will affect the performance of GaN transistors in the constant current mode (switching mode). Hence, in the present disclosure, the first depletion-type GaN transistor Q4, the first enhancement-type field effect transistor Q2, the second depletion-type GaN transistor Q3, and the second enhancement-type field effect transistor Q1 are integrally packaged, which can reduce a parasitic inductance and optimize a switching speed of the first depletion-type GaN transistor Q4 in the constant current mode (switching mode).

It is noted that under the circumstances of the same on-resistance, the terminal capacitance of a GaN transistor is relatively lower and the reverse recovery loss caused by the body diode is avoided, so that the performance and switching speed of the GaN transistor are superior to a silicon-metal oxide semiconductor field effect transistor. Hence, as compared with the silicon-metal oxide semiconductor field effect transistors, the GaN transistors can achieve a higher switching frequency to reduce switching loss, improve power density and transient performance. That is, during high-frequency switching, the switching speed of the GaN transistors is much faster than that of the silicon-metal oxide semiconductor field effect transistors. Therefore, in the present disclosure, by utilizing the configuration in which the first depletion-type GaN transistor Q4 and the second depletion-type GaN transistor Q3 are used as the power elements in the fast charging driver 10, the switching loss is reduced and the power density and transient performance are improved.

Figure 3:
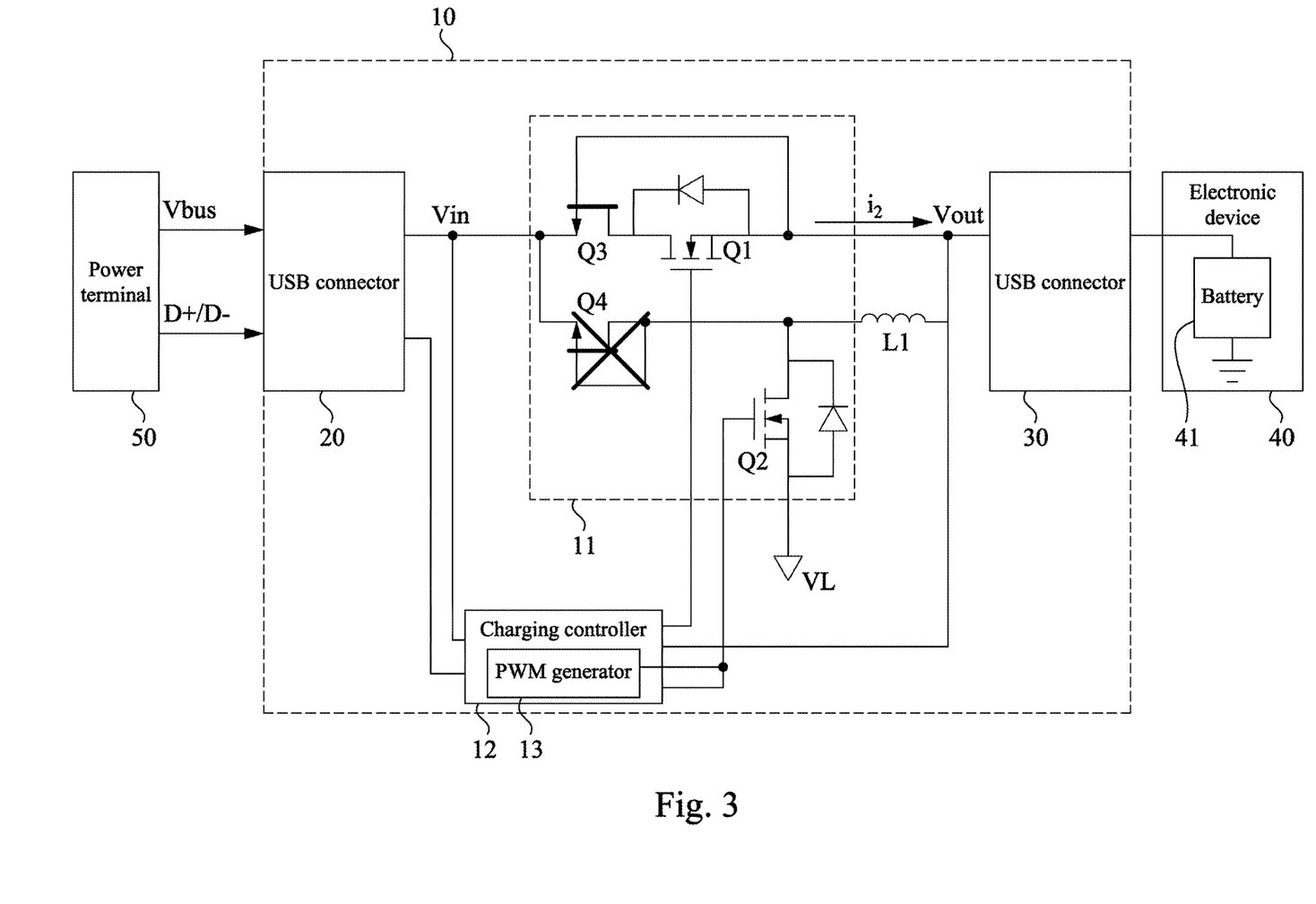
FIG. 3 depicts a circuit diagram of the fast charging driver in FIG. 1 in a constant voltage mode.

For a better understanding, a description is provided with reference to FIG. 3 for an operation of the fast charging driver 10 in the constant voltage mode. FIG. 3 depicts a circuit diagram of the fast charging driver 10 in FIG. 1 in a constant voltage mode.

In the constant voltage mode, the charging controller 12 turns on the second enhancement-type field effect transistor Q1, so that the second terminal of the second depletion-type GaN transistor Q3 is connected to the output terminal Vout of the fast charging driver 10 to transmit the power voltage of the power terminal 50 to the anode of the battery 41 through the second depletion-type GaN transistor Q3, the second enhancement-type field effect transistor Q1, and the USB connector 30. In this manner, the battery 41 is charged with a constant voltage. At this time, a charging current in the constant voltage mode is denoted by $i_2$. In addition, the charging controller 12 turns on the first enhancement-type field effect transistor Q2, so that the second terminal and the gate terminal of the first depletion-type GaN transistor Q4 are electrically connected to the system low voltage terminal VL. In this manner, the voltage levels of the second terminal and the gate terminal of the first depletion-type GaN transistor Q4 are pulled down, so that the current path from the input terminal Vin to the output terminal Vout through the first depletion-type GaN transistor Q4 is turned off.

In some embodiments, a sensor (for example, a current sensor or a voltage sensor) in the charging controller 12 is electrically coupled to the output terminal Vout of the fast charging driver 10, and is configured to detect a current flow rate or a magnitude of a current at the output terminal Vout of the fast charging driver 10. When the current flow rate or the magnitude of the current at the output terminal Vout of the fast charging driver 10 is less than a critical value (for example, the current $i_2$ is smaller than 50 milliamperes or the flow rate of the current $i_2$ is less than 0.5 times the current flow rate of the battery's nominal capacity), the charging controller 12 turns off the second enhancement-type field effect transistor Q1 and turns on the first enhancement-type field effect transistor Q2. In this manner, the current path from the input terminal Vin to the output terminal Vout is turned off to stop charging the battery 41.

Figure 4:
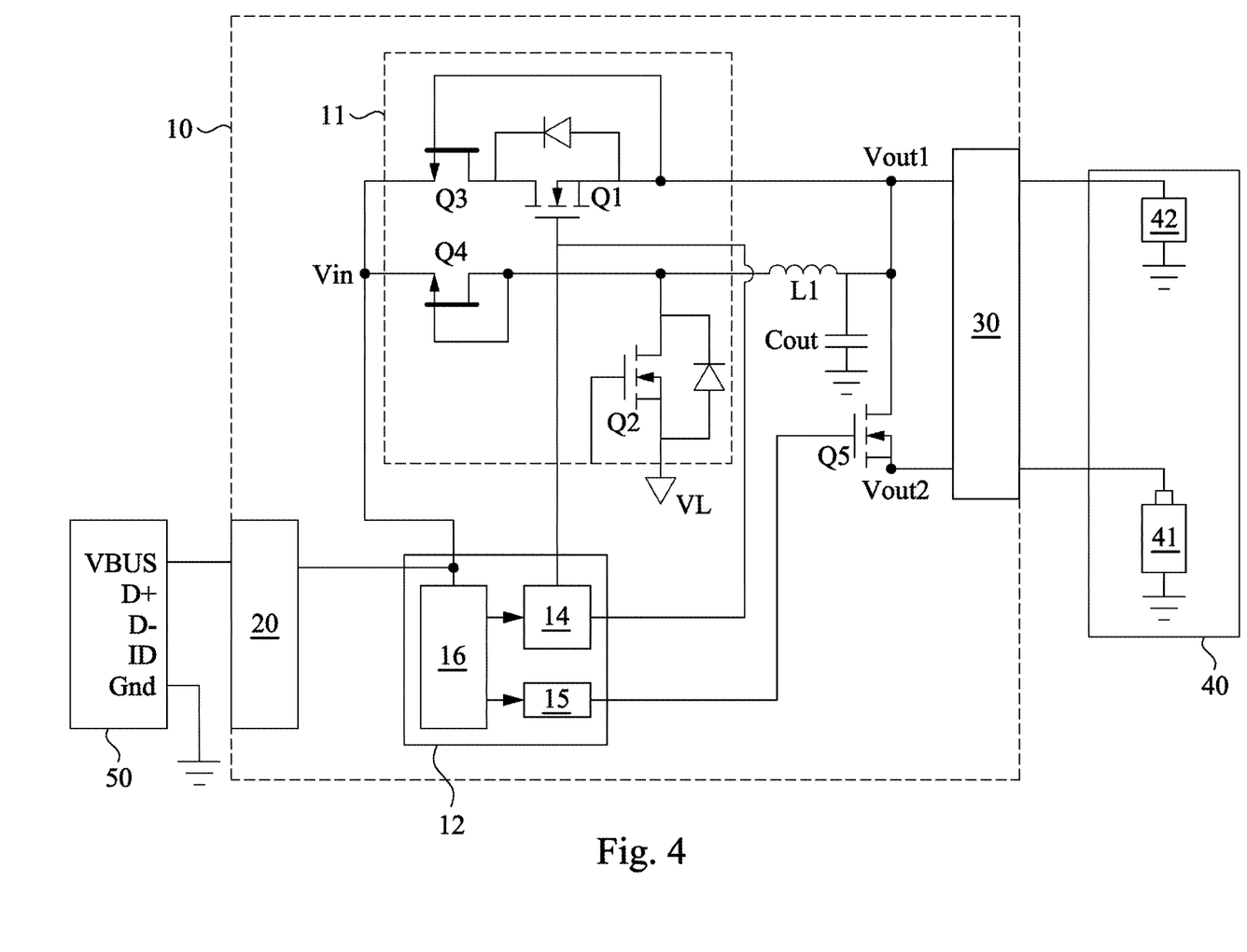
FIG. 4 depicts a circuit structure diagram of a fast charging driver according to some embodiment of the present disclosure.

A description is provided with reference to FIG. 4. FIG. 4 depicts a circuit structure diagram of the fast charging driver 10 according to some embodiment of the present disclosure. To simplify matters, FIG. 4 does not show the USB connectors 20 and 30. As shown in FIG. 4, the fast charging driver 10 comprises the fast charging circuit 11, the inductor L1, a capacitor Cout, a switch Q5, and the charging controller 12. The charging controller 12 comprises a state machine 16, a power path control circuit 15, and a charging control circuit 14. The electronic device 40 comprises the battery 41 and a system load 42. In one embodiment, the charging controller 12 may comprise a processor, a system-on-chip, or an application-specific integrated circuit (ASIC). In one embodiment, the state machine 16, the power path control circuit 15, and the charging control circuit 14 may be implemented on the processor, the system-on-chip, or the application-specific integrated circuit (ASIC) through software and/or firmware.

The state machine 16 is configured to receive information of the power terminal 50 and control the charging control circuit 14 to perform different charging modes (for example, constant voltage charging or constant current charging). Additionally, the state machine 16 can control the power path control circuit 15 according to a battery level of the battery 41 of the electronic device 40 to turn on a charging path connected from an output terminal Vout2 of the fast charging driver 10 to the battery 41. For example, when the battery level of the battery 41 is at 65%, the state machine 16 controls the power path control circuit 15 to turn on the switch Q5, so that an anode of the battery 41 is connected to the output terminal Vout2 of the fast charging driver 10. When the battery level of the battery 41 is at 100%, the state machine 16 controls the power path control circuit 15 to turn off the switch Q5, so that the anode of the battery 41 is disconnected from the output terminal Vout2 of the fast charging driver 10 and the fast charging driver 10 only charges the system load 42 of the electronic device 40.

In summary, the present disclosure utilizes the configuration in which the first depletion-type GaN transistor Q4 and the second depletion-type GaN transistor Q3 are used as the power elements in the fast charging driver 10. In this manner, the switching loss of the fast charging driver 10 in the constant current charging mode and the constant voltage charging mode is reduced to improve the charge speed and reduce the power consumption. In addition to that, utilizing the USB type-C regulated by the USB Power Delivery as the USB connector 20 connected to the fast charging driver 10 allows the fast charging driver 10 to be able to operate at selectable combinations of currents and voltages. As a result, the charge speed is increased.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A fast charging driver comprising:
   a fast charging circuit comprising:
   a first depletion-type GaN transistor, a first terminal of the first depletion-type GaN transistor being electrically coupled to an input terminal of the fast charging driver, a second terminal of the first depletion-type GaN transistor being electrically coupled to a first terminal of an inductor, wherein a second terminal of the inductor is electrically coupled to an output terminal of the fast charging driver, wherein the output terminal of the fast charging driver is configured to be electrically coupled to an anode of a battery;
   a first enhancement-type field effect transistor, a first terminal of the first enhancement-type field effect transistor being electrically coupled to the second terminal and a gate terminal of the first depletion-type GaN transistor, a second terminal of the first enhancement-type field effect transistor being electrically coupled to a system low voltage terminal, a gate terminal of the first enhancement-type field effect transistor being configured to receive a PWM signal;
   a second depletion-type GaN transistor, a first terminal of the second depletion-type GaN transistor being electrically coupled to the input terminal of the fast charging driver; and
   a second enhancement-type field effect transistor, a first terminal of the second enhancement-type field effect transistor being electrically coupled to a second terminal of the second depletion-type GaN transistor, a second terminal of the second enhancement-type field effect transistor being electrically coupled to a gate terminal of the second depletion-type GaN transistor and the output terminal of the fast charging driver, a gate terminal of the second enhancement-type field effect transistor being configured to receive a control signal.

2. The fast charging driver of claim 1, further comprising:
   a charging controller configured to receive battery level information of an electronic device from the electronic device, and control the first enhancement-type field effect transistor and the second enhancement-type field effect transistor according to the battery level information.

3. The fast charging driver of claim 2, wherein:
when the battery level information of the electronic device is lower than a threshold value, the charging controller controls a PWM generator to generate the PWM signal to the gate terminal of the first enhanced field effect transistor; and
when the battery level information of the electronic device is higher than the threshold value, the charging controller generates the control signal to the gate terminal of the second enhanced field effect transistor.

4. The fast charging driver of claim 2, wherein when the battery level information of the electronic device is lower than a threshold value, the charging controller turns off the second enhancement-type field effect transistor, so that the second terminal of the second depletion-type GaN transistor is disconnected from the output terminal of the fast charging driver, and the charging controller controls a PWM generator to generate the PWM signal to the gate terminal of the first enhanced field effect transistor.

5. The fast charging driver of claim 4, wherein when the PWM signal is at a high level, the first enhancement-type field effect transistor is turned on, so that a voltage of the system low voltage terminal is transmitted to the gate terminal of the first enhancement-type field effect transistor through the first enhancement-type field effect transistor, and when the PWM signal is at a low level, the first enhancement-type field effect transistor is turned off, wherein a voltage change of the first terminal of the inductor is converted into a current through the inductor in response to switching of the first enhancement-type field effect transistor, and the output terminal of the fast charging driver outputs the current to the battery.

6. The fast charging driver of claim 2, wherein when the battery level information of the electronic device is higher than a threshold value, the charging controller turns on the first enhancement-type field effect transistor to pull down a voltage of the gate terminal of the first depletion-type GaN transistor, so that the second terminal of the first depletion-type GaN transistor is disconnected from the output terminal of the fast charging driver, and the second enhancement-type field effect transistor is turned on, so that the second terminal of the second depletion-type GaN transistor is connected to the output terminal of the fast charging driver.

7. The fast charging driver of claim 2, wherein the charging controller is electrically coupled to the output terminal of the fast charging driver to measure a charging current, when a charge speed of the charging current is less than a critical value, the charging controller controls the second enhancement-type field effect transistor to turn off and the first enhancement-type field effect transistor to turn on.

8. The fast charging driver of claim 2, wherein the fast charging circuit is disposed on a first substrate, the charging controller is disposed on a second substrate different from the first substrate.

9. The fast charging driver of claim 1, wherein the input terminal of the fast charging driver is electrically coupled to a USB connector.

10. The fast charging driver of claim 9, wherein the USB connector is a USB type-C regulated by USB Power Delivery.

11. A system comprising:
an electronic device comprising:
a battery; and
a fast charging circuit comprising:
a first depletion-type GaN transistor, a first terminal of the first depletion-type GaN transistor being electrically coupled to an input terminal of the fast charging driver, a second terminal of the first depletion-type GaN transistor being electrically coupled to a first terminal of an inductor, wherein a second terminal of the inductor is electrically coupled to an output terminal of the fast charging driver, wherein the output terminal of the fast charging driver is configured to be electrically coupled to an anode of the battery;
a first enhancement-type field effect transistor, a first terminal of the first enhancement-type field effect transistor being electrically coupled to the second terminal and a gate terminal of the first depletion-type GaN transistor, a second terminal of the first enhancement-type field effect transistor being electrically coupled to a system low voltage terminal, a gate terminal of the first enhancement-type field effect transistor being configured to receive a PWM signal;
a second depletion-type GaN transistor, a first terminal of the second depletion-type GaN transistor being electrically coupled to the input terminal of the fast charging driver; and
a second enhancement-type field effect transistor, a first terminal of the second enhancement-type field effect transistor being electrically coupled to a second terminal of the second depletion-type GaN transistor, a second terminal of the second enhancement-type field effect transistor being electrically coupled to a gate terminal of the second depletion-type GaN transistor and the output terminal of the fast charging driver, a gate terminal of the second enhancement-type field effect transistor being configured to receive a control signal.

12. The system of claim 11, further comprising:
a charging controller configured to receive battery level information of the electronic device from the electronic device, and control the first enhancement-type field effect transistor and the second enhancement-type field effect transistor according to the battery level information.

13. The system of claim 12, wherein:
when the battery level information of the electronic device is lower than a threshold value, the charging controller controls a PWM generator to generate the PWM signal to the gate terminal of the first enhanced field effect transistor; and
when the battery level information of the electronic device is higher than the threshold value, the charging controller generates the control signal to the gate terminal of the second enhanced field effect transistor.

14. The system of claim 12, wherein when the battery level information of the electronic device is lower than a threshold value, the charging controller turns off the second enhancement-type field effect transistor, so that the second terminal of the second depletion-type GaN transistor is disconnected from the output terminal of the fast charging driver, and the charging controller controls a PWM generator to generate the PWM signal to the gate terminal of the first enhanced field effect transistor.

15. The system of claim 14, wherein when the PWM signal is at a high level, the first enhancement-type field effect transistor is turned on, so that a voltage of the system low voltage terminal is transmitted to the gate terminal of the first enhancement-type field effect transistor through the first enhancement-type field effect transistor, and when the PWM signal is at a low level, the first enhancement-type field effect transistor is turned off, wherein a voltage change of the first terminal of the inductor is converted into a current through the inductor in response to switching of the first enhancement-type field effect transistor, and the output terminal of the fast charging driver outputs the current to the battery.

16. The system of claim 12, wherein when the battery level information of the electronic device is higher than a threshold value, the charging controller turns on the first enhancement-type field effect transistor to pull down a voltage of the gate terminal of the first depletion-type GaN transistor, so that the second terminal of the first depletion-type GaN transistor is disconnected from the output terminal of the fast charging driver, and the second enhancement-type field effect transistor is turned on, so that the second terminal of the second depletion-type GaN transistor is connected to the output terminal of the fast charging driver.

17. The system of claim 12, wherein the charging controller is electrically coupled to the output terminal of the fast charging driver to measure a charging current, when a charge speed of the charging current is less than a critical value, the charging controller controls the second enhancement-type field effect transistor to turn off and the first enhancement-type field effect transistor to turn on.

18. The system of claim 12, wherein the fast charging circuit is disposed on a first substrate, the charging controller is disposed on a second substrate different from the first substrate.

19. The system of claim 11, wherein the input terminal of the fast charging driver is electrically coupled to a USB connector.

20. The system of claim 19, wherein the USB connector is a USB type-C regulated by USB Power Delivery.

* * * * *